J. WYKOFF.
Whiffletree.
No. 82,781.
Patented Oct. 6, 1868.
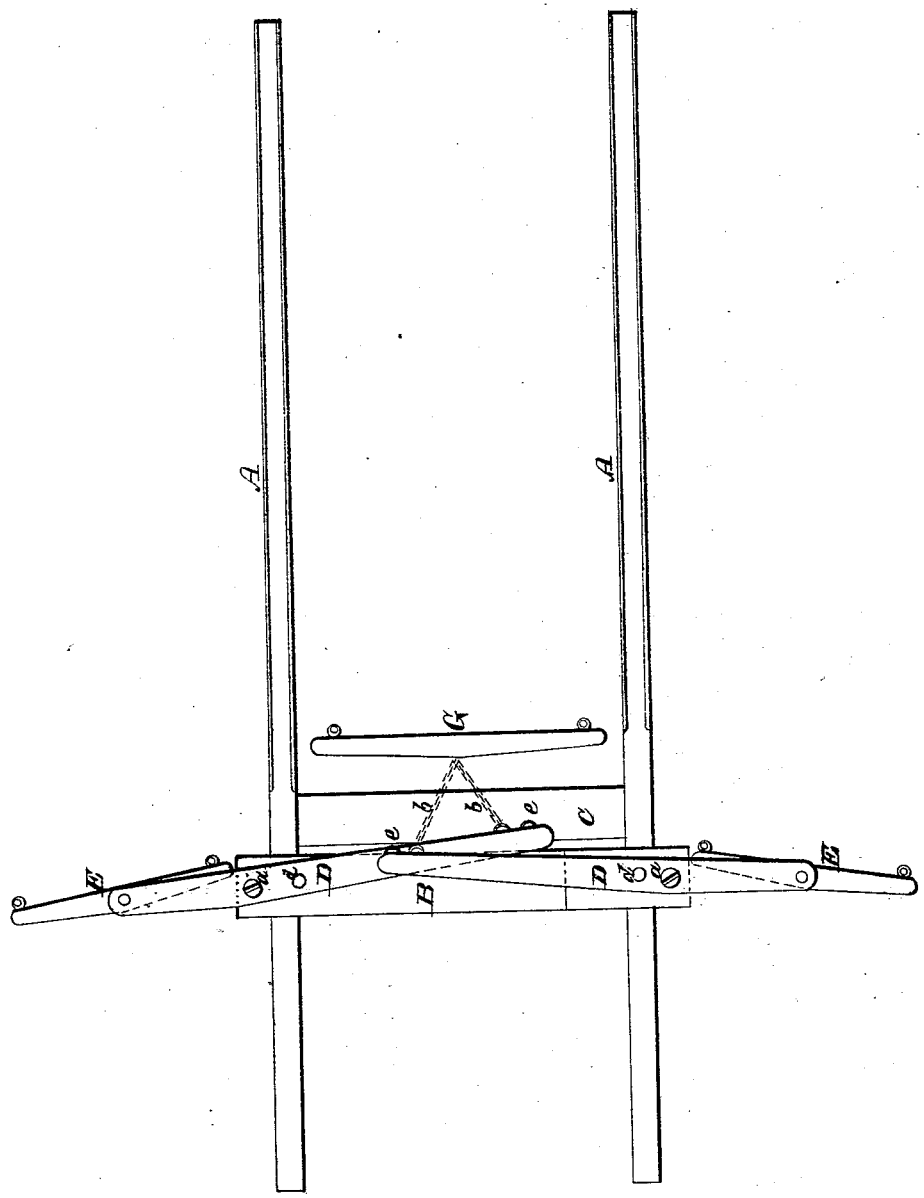

UNITED STATES PATENT OFFICE.

JOHN WYKOFF, OF GRANT CITY, MISSOURI.

IMPROVEMENT IN COMPOUND DOUBLE-TREES.

Specification forming part of Letters Patent No. 82,781, dated October 6, 1868.

*To all whom it may concern:*

Be it known that I, JOHN WYKOFF, of Grant City, in the county of Worth and State of Missouri, have invented a new and useful Improvement in Compound Double-Trees; and I do hereby declare that the following is a full, clear, and exact description thereof, which will enable others skilled in the art to make and use the same, reference being had to the accompanying drawings, forming part of this specification, in which the drawing represents a top view of my invention, which consists of an improved means for working three horses abreast.

Similar letters of reference indicate like parts.

The invention is applicable to vehicles, gang-plows, cultivators, and such other apparatus that are drawn on the ground by horses or other draft-animals with which traces are employed.

The object of the invention is to obtain a more equable draft for the three animals, and to operate advantageously in other respects, as will be set forth.

It consists of a double tongue or shafts, within which the middle horse works, he being hitched to a single-tree, which is attached by a pair of chains, or the equivalent thereof, to the inner ends of double-trees, which overlap each other, and are provided at their outer ends with single-trees for the outside horses. The double-trees are pivoted to the tongues or shafts, or to a splinter-bar affixed across the tongues or shafts.

In the accompanying drawings, A A are the tongues, which are attached to the vehicle or other apparatus to be drawn in any suitable manner. B is the splinter-bar, and D D the lapping double-trees pivoted thereto at $a\ a$. $b\ b$ are the chains connecting the middle single-tree G with the inner or larger arms of the double-trees. E E are the outer double-trees. C is a cross-brace of the tongues or shafts. One of the double-trees is raised by a block or other means sufficiently to permit the inner arms to vibrate without interfering.

Each of the chains $b$ is attached to a double-tree, as shown, by which means the draft-strain of the middle horse is transmitted equally to the two double-trees when on level ground; but when one wheel of the vehicle encounters an obstruction, the resistance of the latter causes the inner arm of the double-tree on that side to vibrate backward, thus bringing the draft-strain of the middle horse entirely upon the said double-tree, which conduces to easy passage over the obstruction of the vehicle.

The inner arms of the double-trees are double the length of the outer arms, so that if the horses are all of equal energy and strength, the draft-strain will be equally apportioned among them all; but if otherwise, the leverage of the double-trees must be changed by shifting the pivot pin or bolt $a$ to the holes $d$ in the double-trees when the outside horses are young horses, or weaker animals than the middle horses. If one only of the outer horses is of insufficient strength, then one only of the double-trees must be changed.

The staples $c\ c$ are for the purpose of shifting the point of attachment of the chains when the double-trees have been adjusted, as described.

When A A are tongues, each will require a neck-yoke, the inner arms of which will be preferably longer than the outer arms, that the holding-back strain may be more equably apportioned among the animals.

When A A are shafts, which are preferable when young horses are being broken to harness, neck-yokes will not be required.

Having thus described my invention, I claim as new and desire to secure by Letters Patent—

The double-trees D D, tongues A A, single-trees E G E, chains $b\ b$, or their equivalent, all constructed and operating substantially as and for the purpose shown and described.

JOHN WYKOFF.

Witnesses:
JEREMIAH NORRIS,
GEORGE W. NORRIS.